US010062895B2

(12) United States Patent
Schemberg et al.

(10) Patent No.: US 10,062,895 B2
(45) Date of Patent: Aug. 28, 2018

(54) SECURING DEVICE

(71) Applicant: Audi AG, Ingolstadt (DE)

(72) Inventors: Florian Schemberg, Ingolstadt (DE); Roman Ranzinger, Gaimersheim (DE)

(73) Assignee: Audi AG, Ingolstadt (DE)

( * ) Notice: Subject to any disclaimer, the term of this patent is extended or adjusted under 35 U.S.C. 154(b) by 358 days.

(21) Appl. No.: 14/912,188

(22) PCT Filed: Jul. 16, 2014

(86) PCT No.: PCT/EP2014/001942
§ 371 (c)(1),
(2) Date: Feb. 16, 2016

(87) PCT Pub. No.: WO2015/022045
PCT Pub. Date: Feb. 19, 2015

(65) Prior Publication Data
US 2016/0211503 A1 Jul. 21, 2016

(30) Foreign Application Priority Data
Aug. 16, 2013 (DE) .................... 10 2013 013 662

(51) Int. Cl.
H01M 2/34 (2006.01)
H01M 2/20 (2006.01)
H01H 37/76 (2006.01)
H01H 85/02 (2006.01)

(52) U.S. Cl.
CPC .......... H01M 2/348 (2013.01); H01H 37/761 (2013.01); H01M 2/202 (2013.01); H01H 37/76 (2013.01); H01H 2037/762 (2013.01); H01H 2085/025 (2013.01); H01M 2200/103 (2013.01)

(58) Field of Classification Search
CPC .................. H01M 2/348; H01M 2/202
See application file for complete search history.

(56) References Cited

U.S. PATENT DOCUMENTS 5,747,187 A 5/1998 Byon
2008/0254330 A1* 10/2008 Jones .................. H01M 12/065
429/407

FOREIGN PATENT DOCUMENTS

CN 1218578 6/1999
CN 1395750 2/2003

OTHER PUBLICATIONS

Chinese Search Report dated Mar. 28, 2017 with respect to counterpart Chinese patent application 201480045465.7.
Translation of Chinese Search Report dated Mar. 28, 2017 with respect to counterpart Chinese patent application 201480045485.7.

* cited by examiner

*Primary Examiner* — Olatunji A Godo
(74) *Attorney, Agent, or Firm* — Henry M. Feiereisen, LLC

(57) ABSTRACT

A securing device for an electrical arrangement is disclosed. The electrical arrangement has at least one electrical component, which has at least one electrical contact element, and at least one electrical connection element, wherein the contact element of the component is connected to the electrical connection element by means of an electrically conductive adhesive, wherein at least one actuator is arranged between the component and the electrical connection element, and an actuating force that moves the component and the connection element apart from one another can be exerted via said at least one actuator.

19 Claims, 1 Drawing Sheet

SECURING DEVICE

CROSS-REFERENCES TO RELATED APPLICATIONS

This application is the U.S. National Stage of International Application No. PCT/EP2014/001942, filed Jul. 16, 2014, which designated the United States and has been published as International Publication No. WO 2015/022045 and which claims the priority of German Patent Application, Serial No. 10 2013 013 662.8, filed Aug. 16, 2013, pursuant to 35 U.S.C. 119(a)-(d).

BACKGROUND OF THE INVENTION

The invention relates to a securing device for an arrangement of at least one electric component, which has at least one electric contact element and at least one in particular rail like electric connection element, wherein the contact element of the component is connected or connected with the electric connection element by means of an electrically conductive adhesive.

Corresponding securing devices are generally known and are usually used for example during production or assembly of an energy storage arrangement, wherein typically multiple energy storages, which each have a number of energy storage cells that are combined modularly or in the manner of stacks in an energy storage housing, are connectable or are connected with an in particular rail-like electrical connection element, in order to reduce the risk of injury to personnel. The risk of injury usually stems from incorrect installation of energy storages during assembly of the energy storage arrangement, which may lead to the formation of electric short-circuits and electric arcs.

While corresponding securing devices known from the state-of-the-art offer certain technical solutions that make the assembly of corresponding energy storage arrangements safer, i.e. in particular the electric contacting of corresponding energy storages with an electric connection element, generally the electric connection of an electrical component with an electrical connection element, there is still a need for improvement in this field.

SUMMARY OF THE INVENTION

The invention is based on the object to set forth an improved securing device.

The object is solved according to the invention by a securing device of the aforementioned type, which is characterized in that between the component and the electrical connection element at least one actuator is arranged via which an actuating force can be exerted, which moves the component and the connection element apart.

The securing device according to the invention increases safety by reducing the risk to which personnel are exposed when electrically contacting or connecting a current conducting electrical component with an electrical connection element, i.e., for example during assembly of an energy storage arrangement, i.e., in particular when electrically contacting corresponding energy storages with an electrical connection element. This is due to the at least one actuator arranged between the electric component, i.e., for example an energy storage, and the electrical connection element, via which actuator an actuating force can be exerted, which moves the electric storage and the electrical connection element apart. The actuating force is usually capable of eliminating or interrupting an electrical as well as mechanical connection between the contact element of the component, which may for example be a cell pole, and the electrical connection element, which is typically a conductor rail for busbar, and is formed by an electrically conductive adhesive. The actuating force, which can be or is exerted via the actuator, is thus sufficient to spatially move the component and the electrical connection element apart so that under certain circumstances an electrical (as wells as mechanical) connection formed by means of an electrically conductive adhesive is eliminated or interrupted. This in particular makes it possible to interrupt an electrical short-circuit, and the electric arc usually associated therewith, resulting for example from incorrect installation. This reduces the risk of thermally induced damage to the electrical component or components, i.e., for example one or multiple electric energy storages, or the connection element, which may result from the electric short circuit and the high electrical loads generated thereby, which may even cause a fire. This also reduces the risk of thermally induced damage to the component or the electrical connection element and the risk of thermally induced injuries to the personnel that may result from the electric arc.

Generally, in order for the actuating force exerted via the actuator to cause corresponding electrical elements of the component and a corresponding electrical connection element to move apart, the adhesive force, generally the joining force, exerted by the electrically conductive adhesive has to be eliminated or weakened. Elimination or weakening of the adhesive force in particular results from a material inherent change of the adhesive properties of the adhesive due to an external influence, in particular an electric short circuit, during electrically contacting or connecting the electrical component with the electrical connection element, i.e., during assembly of an energy storage arrangement, which involves connecting contact elements of the energy storage with an electrical connection element, so that the adhesive properties or the adhesive force exerted by the adhesive is directly reduced or even eliminated. This can for example result from dissolving, damaging, softening, evaporating, embrittling etc. of the electrically conductive adhesive.

The electrical component is preferably an electric energy storage. The term energy storage in the context of the invention means an energy storage cell or multiple energy storage cells that are combined modularly or in the manner of a stack. The individual energy storage cells are typically received in an energy storage housing. The respective energy storages received in the energy storage housings are typically in turn received in a housing part, which belongs to an energy storage arrangement.

The described principle is in particular advantageous when the electrically conductive adhesive is formed from an adhesive material, which softens when exceeding a adhesive-specific softening temperature. The electrically conductive adhesive or the specific softening temperature of the adhesive is advantageously selected so that below the softening temperature the adhesive force exerted via the electrically conductive adhesive between the contact elements of the component and the electrical connection element is greater or equal to the actuating force exerted by the actuator, and above the softening temperature is smaller than the actuating force exerted by the actuator. The adhesive material, which forms the electrically conductive adhesive thus softens when reaching or exceeding the softening temperature, i.e., it loses its original adhesive properties, which results in the reduction of the adhesive force exerted by the adhesive. The electrically conductive connection and mechanical connection generated via the electrically conductive adhesive between the contact elements of the component and the electrical connection element thus loses electrical stability and also mechanical stability. The reduction of the adhesive force makes it possible to overcome the previously existing electrical and mechanical connection between the contact elements of the component and the electric connection element via the force exerted via the actuator. This means vice versa that the adhesive force exerted by the adhesive below the softening temperature is sufficiently high so as to exceed or at least compensate the actuating force exerted via the actuator. The actuating force exerted via the actuator is in this case not capable to overcome the existing electrical and mechanical connection between the contact elements of the component and the electrical connection element. As mentioned, the adhesive-specific softening temperature, which of course also includes a corresponding temperature range, may be reached or exceeded as a result of an electric short circuit, which may in particular result from incorrect assembly of components configured as energy storage, and which may lead to a brief drastic temperature increase (far) above the adhesive-specific softening temperature and thus to a softening, or even dissolution of or damage to, the adhesive.

Generally the term softening temperature thus means a temperature at which the adhesive properties of the electrically conductive adhesive and the adhesive forces resulting from the adhesive-specific properties significantly change, i.e., decrease or become impaired. In the case of a strong temperature increase resulting from an electric short circuit this may occur within a few seconds, in particular also within fractions of a second.

The electrically conductive adhesive may be thermally curable, wherein the curing or initiation of the curing process occurs when exceeding an adhesive-specific curing temperature. Providing or maintaining a sufficient electrical and also mechanical connection between the contact elements of the component and the electrical connection element, requires in this embodiment impinging the adhesive, at least briefly, with a temperature above the adhesive-specific curing temperature, wherein the time in particular depends on the adhesive-specific composition. Typically the temperature input causes a physical or chemical process, for example a cross-linking reaction, which leads to a sufficient mechanical joining or adhesive force, i.e., an adhesive force above the actuating force that can be or is exerted by the actuator. A further temperate input required for a further or complete curing of the adhesive is not strictly required in this context, an initial partial curing of the adhesive is sufficient when the initial curing ensures a sufficiently stable mechanical connection between the contact elements of the energy storage and the electrical connection element. As a result of the incomplete curing of the electrically conductive adhesive, the electric connection between the electrical component and the electrical connection element typically conducts less current than in the completely cured state. Thus partial curing of the adhesive causes the securing device to trigger early, for example during installation of an energy storage arrangement, and thus constitutes a high protection level for the personnel. However, the electrical connection formed via the partially cured adhesive is typically sufficiently stable so that tests such as bandentests can be conducted.

The residual curing can subsequently, i.e., in particular in the case of a component that is configured as energy storage take place for example during transport to a point of use for example to a motor vehicle. Typically curing of the adhesive is complete at the time of mounting in an application. The energy storage is thus available at full capacity.

In the case of a thermally curable electrically conductive adhesive the latter is advantageously configured or constituted so that the curing temperature lies below the softening temperature. The softening temperature can for example be in the range of about 100° C. the curing temperature can for example be in the range of about 70° C. The electrically conductive adhesive is typically configured so that curing of the adhesive occurs significantly faster at higher temperatures than at lower temperatures, for example at room temperature (about 25° C.). Correspondingly curing of the electrically conductive adhesive can generally also take place at low temperatures, for example at room temperature, which however takes more time.

The electrically conductive adhesive can thus in particular be made of a thermosetting, optionally thermally curable or cross-linkable, plastic or may include such a thermosetting plastic.

The electrically conductive properties of the electrically conductive adhesive, in particular also of the electrically conductive adhesive formed by a thermosetting plastic, can in particular be based on electrically conductive particles, for example graphite or silver particles, distributed in the adhesive and/or by material-inherent electrically conductive properties such as in an electrically conductive adhesive that is based on or formed by a thermosetting material. In the latter case the electrically conductive adhesive can for example be based on a polyaniline.

The actuator can be configured as a pressure spring or can include a pressure spring. The pressure spring is configured or constructed so that a corresponding actuating force or spring force can be exerted that causes the contact elements of the component and the electrical connection element to move apart, in particular fast or suddenly, when reducing the adhesive force exerted by the electrically conductive adhesive. The spring properties desired for a concrete application, i.e., in particular a desired spring stiffness, can be set in particular by selecting the material, the construction and the pre-tension of the spring associated therewith.

The pressure spring is in particular made of an electrically insulating material such as for example an elastomer. The elastomer can for example be a natural or synthetic rubber. The pressure spring can in particular be configured ring shaped or helical and may be arranged about the contact element of the component so as to surround the contact element. When the pressure spring is arranged about a contact element of the energy storage, the arrangement of the pressure spring so as to surround the contact element of the energy storage contributes to a most compact construction of the energy storage arrangement. At the same time the pressure spring is thereby also securely supported on the energy storage arrangement.

Preferably the pressure spring is configured taller than the contact element of the component so that the pressure spring has to be compressed in order to generate a mechanical connection between the component, i.e., for example an energy storage, i.e., a contact element of the energy storage, and the electrical connection element. The pressure spring thus typically protrudes in particular in its non-compressed state axially over the contact element of the component or energy storage to a defined degree.

In order to increase the safety regarding to the formation or generation of electric short circuits and corresponding electric arcs, a housing part of the securing device can be filled with at least one electrically insulating protective gas. Concretely the protective gas can for example be sulfur hexafluoride (SF6).

The invention also relates to an energy storage arrangement, including a securing device as described above. The energy arrangement includes in particular at least one electric energy storage, which has at least one electrical contact element and at least one, in particular rail like, electric connection element, wherein the contact element of the energy storage is connected with the electrical connection element by means of an electrically conductive adhesive. The energy storage arrangement is characterized in that between the energy storage and the electrical connection element at least one actuator is arranged via which an actuating force, which moves the energy storage and the connection element apart, can be exerted.

The invention also relates to a method for electrically contacting an electrical contact element of an electrical component, in particular an electric energy storage, with an electrical connection element by means of an electrically conductive adhesive. The method is characterized in that between the component and the electrical connection element at least one actuator is arranged via which an actuating force can be exerted, which moves the component and the electrical connection element apart, wherein during the electrical contacting of the contact element of the component with the electrical connection element the actuator is compressed against the actuating force exerted by the actuator.

The discussion regarding the securing device according to the invention thus analogously applies to the energy storage according to the invention and also to the method according to the invention.

BRIEF DESCRIPTION OF THE DRAWING

Further advantages, features and details of the invention will become apparent from the exemplary embodiments described below and by way of the drawings. It is shown in.

DETAILED DESCRIPTION OF PREFERRED EMBODIMENTS

Figure 1:
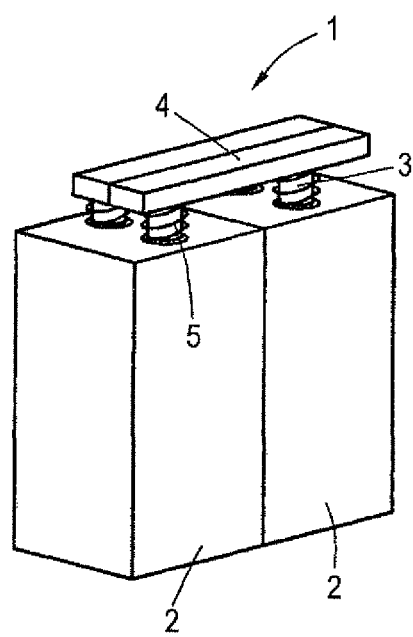
FIG. 1 a schematic representation of a securing device according to an exemplary embodiment of the invention.

FIG. 1 shows a schematic representation of a securing device 1 according to an exemplary embodiment of the invention. The securing device 1 is assigned to an energy storage arrangement. The energy storage arrangement is for example provided for supplying an electric drive motor of a motor vehicle (not shown). The energy storage arrangement can thus be referred to as traction battery.

The energy storage arrangement includes a number of electrical components in the form of energy storages 2. FIG. 1 representatively shows only two energy storages 2, however, the energy storage arrangement can of course also include more than the two energy storages 2. The energy storages 2 each consist of energy storage cells (not shown) that are combined modularly or in the manner of stacks, in particular lithium-cells, which are received in respective energy storage housings. The energy storages 2 each have electrical contact elements 3 in the form of energy storage-poles or cell-poles. The contact elements 3 protrude from a topside or front side of the respective energy storages 2.

During assembly of the energy storage arrangement the energy storages 2 can be or have been connected with an electrical connection element 4 in the form of a conductor or busbar. The electric connection between the respective energy storages 2 and the electrical connection element 4 is accomplished via the respective contact elements 3 of the energy storage. The electrical and mechanical connection between the contact elements 3 of the energy storage and the electrical connection element 4 is accomplished by means of conductive gluing, i.e. via an electrically conductive adhesive. Thus in particular the free surfaces of the contact elements 3 of the energy storage that face the electrical connection element 4 have to be or are provided with the adhesive.

As can be seen, an actuator 5 in the form of a helical pressure spring, which is formed from an electrically insulating elastomer material, is arranged between the energy storages 2 and the electrical connection element 4. Typically a corresponding actuator is assigned to each of the contact elements of the energy storage. The actuator 5 rests against a surface section of the energy storage 2 with its end surface, which faces the energy storage 2 and rests against a surface section of the electrical connection element 4 with its end surface, which faces the electrical connection element 4. The actuator 5 surrounds the contact elements 3, which typically have a cylindrical cross section. In the non-compressed state the actuator 5 protrudes over contact elements 3 axially relative to the symmetry axis of the contact elements. The actuator 5 is thus taller in its non-compressed state than a respective contact element 3.

Figure 2:
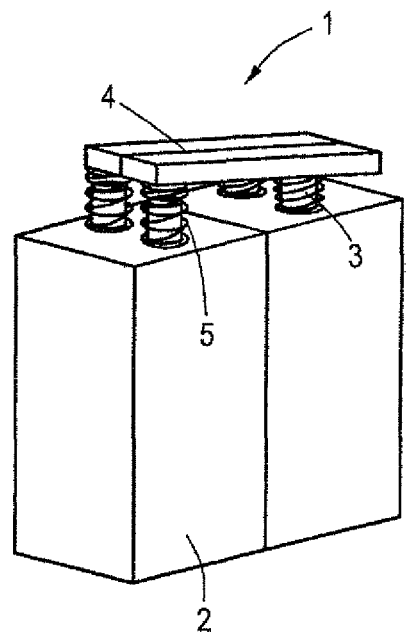
FIG. 2 a further schematic representation of the securing device show in FIG. 1.

An actuating force can be exerted via the actuator 5. The actuating force is directed so as to enable a moving apart of the respective energy storage 2 or the contact elements 3 of the energy storage and the connection element 4 and thus to interrupt the electrical and also mechanical connection between the contact elements 3 of the energy storage and the electrical connection element 4 (see FIG. 2). This renders the electrical connection element 4 current-free. This interrupts or prevents the formation of the electric short circuits or electric arcs associated therewith. However, this requires that the actuating force exerted via the actuator 5 is greater than the joining or adhesive force exerted by the electrically conductive adhesive. Because the energy storages 2 are typically supported stationary or immovable in a housing part of the energy storage arrangement, it is generally only possible to move or push the electrical connection element 4 away from the energy storages 2 or from the contact elements 3 of the energy storages via the actuating force that can be exerted via a respective actuator.

Generally, for exerting the actuating force via the actuator 5 so that the actuating force causes the contact elements 3 of the energy storage arrangement and the electric connection element 4 to move apart, the adhesive force exerted by the electrically conductive adhesive and the mechanical connection between the contact elements 3 of the energy storage and the electrical connection element 4 associated with the adhesive force must be eliminated or weakened. The adhesive force is weakened or eliminated in particular as a result of an external influence, in particular a short circuit, which occurs during assembly of the energy storage arrangement and which changes material-inherent adhesive properties of the electrically conductive adhesive so that the adhesive properties or the adhesive force exerted via the electrically conductive adhesive is directly reduced or eliminated.

The electrically conductive adhesive is typically made of an adhesive material which when exceeding an adhesive-specific softening temperature, which of course may also mean a defined temperature range, is softened and thus changes its adhesive properties as described above. Above the softening temperature the adhesive properties and the adhesive force exerted via the adhesive is reduced so that the adhesive force exerted via the adhesive is smaller than the actuating force exerted by the actuator 5, and as a result the electrical connection element 4 is moved away or spaced apart from the contact elements 3 of the energy storage so that an electrical connection between the latter is interrupted. The softening temperature can in particular be reached as a result of incorrect assembly of the energy storages 2 and an electric short circuit resulting from the incorrect assembly. Thus the securing device 1 realizes a short circuit safety, which in the event of a short circuit enables an electrical separation of the electrical connection element 4 from the energy storages 2 or the contact elements 3 of the energy storages.

Concretely the electrically conductive adhesive can be an adhesive based on a thermosetting plastic with electrically conductive particles dispersed therein, i.e., in particular metallic particles such as silver particles. The compression of the adhesive during the joining process can cause the electrically conductive particles to be arranged between the contact elements 3 of the energy storages and the electrical connection element so as to form electrically conductive paths.

The electrically conductive adhesive can be thermally cured. The curing of the adhesive occurs when exceeding an adhesive-specific curing temperature. The electrically conductive adhesive is typically configured so that the adhesive cures significantly faster at higher temperatures than at lower temperatures, for example room temperature. Correspondingly the curing of the adhesive can generally also take place at lower temperatures for example at room temperature, which however takes more time.

The curing temperature of the electrically conductive adhesive is typically significantly below the softening temperature of the adhesive. The curing temperature is typically defined by the composition of the adhesive. For example the curing temperature may be in a range of 70° C. Hereby the adhesive has to be at least briefly impinged with a temperature above its adhesive-specific curing temperature. Typically the temperature input causes a chemical or physical process, for example a cross-linking reaction, which quickly leads to a formation of a sufficient mechanical joining or adhesive force, i.e., a joining or adhesive force which is above the actuating force that can be or is exerted by the actuator. A temperature input, which would be required to completely cure the adhesive, is not strictly required, a partial curing is sufficient when this partial curing ensures a sufficiently stable mechanical connection between the contact elements 3 of the energy storages and the electrical connection element 4.

In particular a controlled curing of the electrically conductive adhesive is thus possible in two phases. After application of the adhesive to corresponding joining surfaces of the contact elements 3 of the energy storages and the electrical connection element 4, the contact elements 3 of the energy storages are mechanically joined or contacted with the electrical connection elements 4. Hereby the actuator 5 typically has to be a compressed or pressed together against the actuating force exerted by the actuator. By inputting thermal energy or heat in a targeted manner, for example by means of a heater fan, a curing degree of the adhesive can be achieved in a short time so that a gluing force is realized that compensates the actuating force exerted by the actuator 5, thereby generating an electrical and mechanical contact or connection between the contact elements 3 of the energy storages and the electrical connection element 4. The further, optionally complete, curing of the adhesive may take place in a second phase without input of thermal energy, i.e., at ambient conditions, in particular at room temperature (about 25° C.).

As a result of the incomplete curing of the electrically conductive adhesive, the electrical connection between the energy storage 2 and the electrical connection element 4 typically conducts less current than in a completely cured state. In case of a partial curing of the adhesive the securing device 1 therefore triggers early, for example during the mounting of an energy storage arrangement, which constitutes a high level of protection for personnel. On the other hand the electrical connection formed via the partially cured adhesive is also typically sufficiently stable so that tests such as bandentests can be conducted.

The residual curing of the adhesive can then subsequently take place for example during the transport of the energy storage 2 connected with the connection element 4 to an application, for example a motor vehicle. Typically the curing of the adhesive is complete at the time of mounting in the application. The energy storages 2 are thus available at full capacity.

The securing device 1 typically includes a housing part (not shown) in which the energy storages 2 and the electrical connection element 4 are received. The housing part is advantageously filled with an electrically insulating gas, such as sulfur hexafluoride (SF6).

Figure 3:
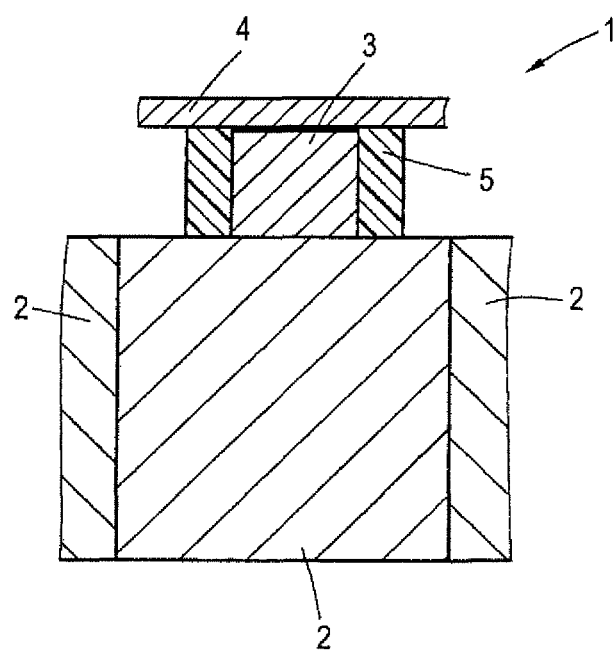
FIG. 3 a sectional view through an energy storage arrangement according to an exemplary embodiment of the invention.

FIG. 3 shows a sectional view through an energy storage arrangement according to an exemplary embodiment of the invention. In the exemplary embodiment shown in FIG. 3, the actuator 5 is not configured as helical pressure spring but as ring-shaped pressure spring. The inner diameter of the actuator 5 is hereby adjusted to he outer diameter of the contact element 3 of the energy storage surrounded by the actuator. Thus the ring-shaped actuator 5 can be pushed, in particular form fittingly, onto the contact element 3 of the energy storage. Also in this connection the actuator 5 is configured taller when viewed axially than the contact element 3 of the energy storage. The electrically conductive adhesive is here indicated by a comparatively thicker line.

The invention claimed is:

1. A securing device for an arrangement of at least one electrical component having at least one electrical contact element and at least one electrical connection element, said securing device comprising:
   an electrically conductive adhesive connecting the electrical contact element with the electrical connection element; and
   at least one actuator formed as a pressure spring or including a ring-shaped or helical pressure spring, and arranged between the electrical component and the electrical connection element and in surrounding relationship with the contact element, said at least one actuator exerting an actuating force, which seeks to move the electrical component and the electrical connection element apart.

2. The securing device of claim 1, wherein the electrical component is an electrical energy storage.

3. The securing device of claim 1, wherein the electrical contact element is rail-shaped.

4. The securing device of claim 1, wherein the electrically conductive adhesive is made of an adhesive material which when exceeding an adhesive-specific softening temperature becomes softened, wherein below the softening temperature the adhesive force between the contact element of the component and the connection element exerted by the electrically conductive adhesive is greater or equal to the actuating force exerted via the actuator and above the softening temperature is smaller than the actuating force exerted by the actuator.

5. The securing device of claim 1, wherein the electrically conductive adhesive is thermally curable, and wherein curing of the electrically conductive adhesive is initiated at a temperature exceeding an adhesive-specific curing temperature.

6. The securing device of claim 5, wherein the curing temperature lies below the softening temperature.

7. The securing device of claim 1, wherein the electrically conductive adhesive is made of a thermosetting plastic or includes a thermosetting plastic.

8. The securing device of claim 1, wherein the pressure spring is made of an eclectically insulating material.

9. The securing device of claim 8, wherein the pressure spring is made of an elastomer.

10. The securing device of claim 1, further comprising a housing part filled with an electrically insulating protective gas.

11. An energy storage arrangement, comprising:
at least one electrical component having at least one electrical contact element and at least one electrical connection element; and
a securing device, said securing device comprising an electrically conductive adhesive connecting the electrical contact element with the electrical connection element; and at least one actuator arranged between the electrical component and the electrical connection element and in surrounding relationship with the contact element, said at least one actuator exerting an actuating force for moving the electrical component and the connection element apart.

12. A method for electrically contacting an electrical contact element of an electrical component with an electrical connection element, comprising:
arranging at least one actuator formed as a pressure spring or including a ring-shaped or helical pressure spring between the electrical component and the electrical connection element so that the pressure spring is in surrounding relationship with the electrical contact element;
electrically contacting the electrical contact element with the electrical connection element via an electrically conductive adhesive, wherein the actuator is compressed during the electrical contacting against an actuating force of the actuator which seeks to move the electrical component and the electrical connection element apart.

13. The method of claim 12, wherein the electrical component is constructed as an electric energy storage.

14. The method of claim 12, wherein the adhesive is made of an adhesive material, which softens when exceeding an adhesive-specific softening temperature, wherein below the adhesive-specific softening temperature an adhesive force exerted by the electrically conductive adhesive between the electrical contact element and the electrical connection element is greater than or equal to the actuating force exerted by the actuator, and above the softening temperature is smaller than the actuating force exerted by the actuator.

15. The method of claim 12, wherein the electrically conductive adhesive is thermally curable, and wherein curing of the electrically conductive adhesive is initiated when exceeding an adhesive-specific curing temperature.

16. The method of claim 14, wherein the curing temperature is lower than the softening temperature.

17. The method of claim 15, further comprising
prior to the electrically connecting, applying the electrically conductive adhesive to respective joining surfaces provided on the contact elements and the electrical connection element;
after the electrically contacting, partially curing the electrically conductive adhesive in a first phase so as to effect a mechanical joining or contacting of the contact elements with the electrical connection element so that an adhesive force is created which compensates the actuating force exerted via the actuator; and
in a second phase following the first phase further curing the electrically conductive adhesive, optionally completely.

18. The method of claim 17, wherein the partial curing is implemented by inputting energy-rich radiation, preferably heat radiation.

19. The method of claim 17, wherein the further curing is implemented without inputting energy-rich radiation.

* * * * *

UNITED STATES PATENT AND TRADEMARK OFFICE
CERTIFICATE OF CORRECTION

PATENT NO.        : 10,062,895 B2
APPLICATION NO.   : 14/912188
DATED             : August 28, 2018
INVENTOR(S)       : Florian Schemberg and Roman Ranzinger It is certified that error appears in the above-identified patent and that said Letters Patent is hereby corrected as shown below:

On the Title Page

Item [56] References Cited
Add the following documents:

U.S. PATENT DOCUMENTS:
5,188,909       02/1993     Pedecini
5,358,798       10/1994     Kleinert III et al.
2011/0211284    09/2011     Yoneda
4,091,186       05/1978     Ott et al.
6,143,440       11/2000     Volz et al.

FOREIGN PATENT DOCUMENTS:
DE 198 37 909       02/2000
JP 2008-205037      09/2008
WO 91/05979         05/1991

Signed and Sealed this
Sixteenth Day of April, 2019

Andrei Iancu
*Director of the United States Patent and Trademark Office*